United States Patent [19]

Kimura

[11] 3,852,388

[45] Dec. 3, 1974

[54] PREPARATION OF ASYMMETRIC POLYMER MEMBRANES

[75] Inventor: Shiro G. Kimura, Schenectady, N.Y.

[73] Assignee: General Electric Company, Schenectady, N.Y.

[22] Filed: Apr. 19, 1973

[21] Appl. No.: 352,428

Related U.S. Application Data

[60] Continuation-in-part of Ser. No. 158,979, July 1, 1971, Pat. No. 3,762,136, which is a division of Ser. No. 36,923, May 13, 1970, Pat. No. 3,709,774.

[52] U.S. Cl................. 264/41, 55/16, 161/159, 210/490, 210/500 M, 260/2.5 R, 260/2.5 M, 260/2.5 N, 260/2.5 HB, 264/DIG. 14
[51] Int. Cl................. B29d 27/04, B01d 39/16
[58] Field of Search........ 264/41, 49; 210/490, 500; 55/16

[56] References Cited
UNITED STATES PATENTS

| | | | |
|---|---|---|---|
| 3,331,772 | 7/1967 | Browscombe et al. | 210/500 |
| 3,332,894 | 7/1967 | Cantor et al. | 264/41 |
| 3,350,844 | 11/1967 | Robb | 55/16 |
| 3,450,650 | 6/1969 | Murata | 264/41 |
| 3,615,024 | 10/1971 | Michaels | 210/500 |

OTHER PUBLICATIONS
Plastics Materials by J. A. Brydson, 1966, pp. 66 and 348.

*Primary Examiner*—Donald E. Czaja
*Assistant Examiner*—Gary R. Marshall
*Attorney, Agent, or Firm*—Leo I. Ma Lossi; Joseph T. Cohen; Jerome C. Squillaro

[57] ABSTRACT

A method is disclosed for the preparation (by the utilization of a proper solvent system) of dry asymmetric membranes comprising a porous layer of interconnected crystals of polymer material. Membranes of many polymer materials may be optionally prepared either with or without a dense surface layer as one face thereof. In either case the porous layer is structured with graded porosity. A three-component casting solution is prepared containing the polymer, a first good volatile solvent for the polymer and (relative to the first solvent) a poor less-volatile solvent for the polymer, which is miscible with the good solvent. A membrane is cast at room temperature, allowed to desolvate at room temperature for a short time and is then immersed in a precipitating agent, that is miscible with both the aforementioned solvents but is a nonsolvent for the polymer. The membrane is then permitted to dry.

2 Claims, 1 Drawing Figure

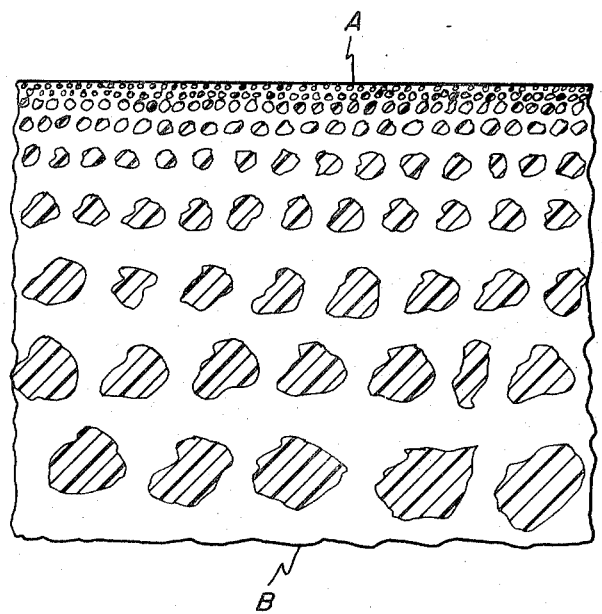

PREPARATION OF ASYMMETRIC POLYMER MEMBRANES

This is a continuation-in-part application of U.S. Pat. Application Ser. No. 158,979 - Kimura, (now U.S. 3,762,136) filed July 1, 1971. Application S.N. 158,979 is, in turn, a division application of Application S.N. 36,923 - Kimura (now U.S. Pat. No. 3,709,774). Both Application S.N. 36,923 and Application S.N. 158,979 are assigned to the assignee of the instant invention.

BACKGROUND OF THE INVENTION

Cellulose acetate reverse osmosis membranes are produced by the practice of such inventions as are described in U.S. Pat. No. 3,133,132 - Loeb et al; U.S. Pat. No. 3,432,585 - Watson et al., and U.S. Pat. No. 3,344,214 - Manjikian et al.

Although it is reported in the literature that the structure of the cellulose acetate appears to be a composite of a very thin dense membrane and a thicker integral porous support substrate, it is recognized by those skilled in the art that the porous region actually displays graded porosity (the effective diameter of the pores decreases in traversing the membrane in the direction of the dense skin). The article "Preparation of Ultrathin Reverse Osmosis Membranes and the Attainment of Theoretical Salt Rejection" by Riley et al (Journal of Applied Polymer Science, Vol. 11, pages 2,143–2,158, 1967) reports an electron microscope study of the structure of such membranes in which it was found that the dense layer of cellulose acetate is about 0.2 microns in thickness and the porous layer is formed integral therewith.

An improvement in the aforementioned method is described in the article "Drying Cellulose Acetate Reverse Osmosis Membranes" by Vos et al., (Industrial Engineering Chemistry - Prod. Res. Develop., 8 (1), pp. 84–89, 1969) to overcome a problem also referred to in the aforementioned patents. As stated in Vos et al., if such membranes are allowed to dry without taking special precautions, they suffer a non-recoverable loss in desalination and physical properties. The Vos et al., method for overcoming this problem prescribes soaking the membrane in a surface active agent. Thereafter, the membrane may be permitted to dry out without deleterious effect.

With respect to dry asymmetrical polymer porous structures, that do not have a non-porous surface layer, cellulose acetate membranes may be prepared without annealing and drying using the Vos et al., technique. Metal porous layers, that approximate an asymmetric porous structure are disclosed in U.S. Pat. No. 3,303,055 - Gumucio wherein a multilayer metal electrode construction is disclosed in which each succeeding layer presents a change in porosity. In preparing the multilayer structure, layers of particulate material are built up in the mold using different particle size material for each of the various layers. The layers of particulate material are then sintered to prepare an integral unit. This porous structure is made of metal, rather than polymer, and must have pores of relatively large dimension since this would be a characteristic inherent from the method of manufacture.

A number of methods have been disclosed for the preparation of porous polymers. U.S. Pat. No. 3,378,507 - Sargent et al., reviews much of the patent art relating to the preparation of porous polymer structures and is incorporated herein by reference.

The preparation of porous anisotropic membranes is disclosed in both U.S. Pat. No. 3,615,024 - Michaels and U.S. Pat. No. 3,567,810 - Baker. The Michaels patent describes the preparation of a membrane having a macroporous support layer and an integral microporous skin from crystalline and/or glassy thermoplastic polymers. Casting and leaching of a solution of the polymer under controlled conditions produces the membrane structure as a consequence of the coaction of diffusion and polymer-precipitation phenomena. The Baker patent discloses that the degree of anisotropy in the membrane structure is critical to achieving desired high fluid flow characteristics without losing the ability to reject high proportions of solute molecules. The objective is a thinner, microporous barrier skin and a more distinct boundary between the barrier skin and the macroporous support. In order to accomplish this Baker teaches subjecting films of the cast polymer solution to a forced evaporation step before the membrane is formed. Temperatures as high as 250°C are indicated, the more severe evaporative procedures producing tighter, thinner skins.

The art is in need of an improved method for the preparation of asymmetric membranes of various glassy and crystalline polymer materials. Further, the gas separation art is particularly in need of integral structures of this type able to present very thin non-porous layers of various polymers for permselective gas separation of high efficiency.

SUMMARY OF THE INVENTION

An asymmetric microporous polymer membrane structure is produced by this invention having a graded porosity, i.e., graded pore size progressing from one major surface of the membrane to the other major surface thereof. The structure may (depending upon the conduct of the process) present the porosity thereof as graded interconnected pores either (a) ranging from an effective diameter of about 100 A at one membrane face to a smaller undetermined size adjacent a dense non-porous layer forming the second face or (b) ranging from an effective diameter of about 100 A at one membrane face to some very small finite value at the opposite face of the membrane through which gas can freely pass.

The method of this invention for the preparation of such membranes involves purely physical phenomena beginning with the selection of a polymer, which can be cast from solution thereof and is soluble to different degrees in two mutually miscible solvents. The better of the two solvents for the polymer must be more volatile than the poorer of the two solvents. Next, a precipitating agent is selected having the properties of being miscible with both the mutually miscible solvents and being a non-solvent for the polymer.

The method steps involve preparing a solution of the polymer in the better solvent and then adding to this solution a quantity ranging from about 10 percent to about 100 percent by volume (of the first solution) of the poorer solvent to prepare the casting solution. A membrane is cast from this polymer solution and is allowed to desolvate for a short time before immersion into the precipitating agent. Immersion time should be long enough for the membrane structure to develop;

that is, of the order of one minute or longer. After the immersion the membrane is dried.

With many polymers that exhibit crystallinity it is possible, depending upon the desolation time employed, to produce either an asymmetric microporous membrane having one thin dense major surface (or skin) or an asymmetric microporous membrane without such a dense skin.

BRIEF DESCRIPTION OF THE DRAWING

The practice of this invention and the products resulting therefrom will be apparent from the following detailed description and the annexed drawing displaying in cross-section the graded porosity of a microporous polymer membrane of this invention having a dense, non-porous skin.

DESCRIPTION OF THE PREFERRED EMBODIMENT

It has been unexpectedly found that by characterizing essential features of the prior art methods employed in the preparation of cellulose acetate reverse osmosis membranes in terms of the solvent system employed and utilizing this characterization in connection with polymers other than cellulose acetate, which are glassy or crystalline, that not only it is possible to prepare asymmetric microporous polymer membranes of these materials having a dense thin surface layer but, as well, microporous graded structures without the dense membrane may also be prepared. Surprisingly each such structure may be dried without the necessity of employing a surface active agent to reduce the surface tension of the leaching agent or of employing liquid extraction or freeze-drying as are described in the aforementioned Vos et al., article.

Among the thermoplastic polymer materials from which asymmetric microporous membranes may be prepared by the practice of this invention are the arylene oxide polymers described in U.S. Pat. No. 3,350,844 - Robb (incorporated by reference), polycarbonate resins such as are described in U.S. Pat. No. 3,256,675 - Robb et al., (incorporated by reference), polyvinyl acetate resins, polyalkyl methacrylate resins, polysulfones, polymers of monovinyl aromatic hydrocarbons, etc.

Both types of asymmetric microporous polymer membranes produced by this invention have a number of applications. Thus, the asymmetric membranes having a thin dense non-porous major surface are particularly useful in gas separation because the composite membrane presents both (a) an extremely thin non-porous film of the polymer membrane through which gas permeation can be conducted and (b) backing support for this thin membrane integral therewith and eliminating any necessity to handle the very thin polymer film for placement on a separate porous support. Asymmetric microporous membranes prepared without the thin dense non-porous surface layer may be used to separate gaseous components from a liquid e.g., in an artificial lung, as battery separators, as support for thin-dip cast polymer membranes, as a filter material, as an immobilizing structure for liquid membranes employed in gas separation or as a component of a composite structure useable to replace leather or fabric.

Once the crystalline polymer from which the membrane is to be prepared has been selected, the solvent system to be employed may be determined in routine fashion. Thus, a volatile (boiling point of about 50°–150°(C) solvent able to dissolve at least 15 percent by weight of the polymer is first selected, if available. If such a solvent is not available, a solvent having characteristics of solubility and volatility as close thereto as possible is selected. Next, (as related to this "good" volatile solvent) a poorer solvent for the same polymer, which is (a) less volatile than the good solvent by a factor of at least about 2, and (b) is miscible with the good volatile solvent is selected in order that a casting solution may be prepared containing these three components; namely, the polymer material, the good volatile solvent, and the poor non-volatile solvent.

The characterization of "good" and "poorer" with respect to the aforementioned solvents illustrates a difference in the capability to dissolve polymer ranging from about 1 ½ to about 20 times, e.g., the "good" solvent should be able to dissolve from about 1 ½ to about 20 times the amount of polymer as will dissolve in the "poorer" solvent.

A similar routine method of selection is employed in determining the liquid precipitating agent. This material must (a) be miscible with both the good solvent and the poor solvent, but (b) be a non-solvent for the polymer material.

Having selected the polymer, the solvent system and the precipitating agent, the procedure for the preparation of the asymmetric microporous membrane is as follows: at least about 10 percent by weight of polymer is dissolved in the good, volatile solvent. A solution is then prepared consisting of about 1 to 9 parts of the polymer solution to 1 part of the poorer, less-volatile solvent. A membrane of this solution is cast upon a flat surface (e.g., a glass plate) in the conventional manner employing a doctor blade with the blade setting ranging from about 5 to 25 mils from the flat surface. The procedure is very straightforward and casting may be accomplished in air at ambient (room) temperatures ranging from about 20° to 25° C. Special atmospheres are not required.

As an alternate procedure the polymer may be added together with the components of the solvent system in a common vessel to form the casting solution. Using this approach the amount of polymer added would be at least about 5 percent by weight.

The decision must be made, of course, as to whether or not the asymmetric membrane is to have a dense, non-porous major surface or not. Having decided which of these structures is desired, the next three steps constitute desolvation (which introduces a variable, desolvation time, in accordance with this selection), immersion in the precipitating agent and then drying of the membrane. The desolvation time necessary for production of the desired asymmetric microporous structure is determined in a routine fashion by employing a range of desolvation times for a series of samples and carrying out the remaining process steps with each of the various samples.

Thus, a very short desolvation time, e.g., 5 seconds may suffice for the preparation of a porous skinned asymmetric microporous membrane while desolvation times in excess of about several minutes may be required to produce a skinned non-porous asymmetric microporous membrane of the same polymer material. The resulting membrane is typically a white, opaque membrane having an area reduced by about 10 percent from the area of the membrane as cast and having a thickness of about 5 to 25 percent of the membrane as cast.

In the case of the skinned non-porous asymmetric microporous membrane, the surface thereof disposed away from the casting surface during the casting operation becomes the dense non-porous layer and is slightly more shiny than the opposite major surface. As is shown schematically in the drawing, the membrane consists of discrete crystals held together by some interconnecting mechanism, which is as yet unknown, representing a relatively stiff system defining a structure having a graded porosity in which the effective diameter of the pores increases with distance traversed from face A to face B. The dense non-porous skin of face A may vary from about 100 A to about 10 microns in thickness.

Because of the crystalline nature of the microporous polymer structure no difficulty has been experienced with problems of cold flow and/or structural collapse as has been stated as being a problem in the preparation of some homogeneous microporous structures. With respect to drying of the membrane this significant crystallinity makes unnecessary any modification of the precipitating agent as by the addition of surface active agents.

The change of porosity with distance through the membrane varies for different polymers, different casting solutions, different casting conditions and different desolvation conditions. Also, with non-porous skinned asymmetric microporous polymer membranes, the initial thickness of the cast film has an effect on the final product in that for a given desolvation time a thicker initial film as cast will result in a somewhat thinner skin. The series of variables recited provides a capability for simply and controllably determining the end product. Once a given set of conditions is fixed, the results are reproducible.

The variables effecting the process and product are as follows:

a. Desolvation Time - shortening of the desolvation time reduces the skin thickness and eventually leads to the production of a microporous membrane without non-porous skin while sufficient lengthening of this variable will eventually produce a non-porous skin with many polymers useful in the practice of this invention;

b. Temperature - conduct of the process at lower temperature acts to increase the desolvation time and vice versa;

c. Solvent System - different solvent systems will contribute different desolvation times;

d. Initial Thickness of Cast Film - for a given desolvation time a thicker film as cast results in a thinner skin.

Suggested solvents and precipitants for particular polymer materials are, by way of example:

| Polymer | Good Solvent | Poorer Solvent | Precipitating Agent |
|---|---|---|---|
| polymethyl methacrylate | acetone | formamide | water |
| polystyrene | acetone | formamide | water |
| copolymer of bisphenol-A and dichlorodiphenyl-sulfone | chloroform | toluene | methanol |

In some instances it is preferable to employ co-solvents as the "good" solvent e.g., when it is necessary to dissolve a polymer, which has both polar and non-polar constituents.

This invention offers particular promise in the preparation of gas separation membranes enabling the production of composite integrated structures having a very thin effective thickness for the permeation medium using less stringent conditions of cleanliness than are necessary, for example, in the solvent casting of ultrathin films. This type of casting of films that are subsequently supported on porous substrates is described and claimed in U.S. Pat. Application S.N. 763,879 - Ward et al., (Composite Permselective Membrane Structure and Preparation Thereof) filed Sept. 30, 1968 (now abandoned) and assigned to the assignee of the instant invention.

EXAMPLE 1

A 10 percent solution of polyxylylene oxide in chloroform was prepared, chloroform being the good, volatile solvent. Next, a solution was prepared consisting of 2 parts of the polyxylylene oxide solution to 1 part dichlorobenzene, the poor, non-volatile solvent.

A membrane was cast in air at ambient temperature and pressure on a glass plate using a doctor blade with a blade setting of 10 mils. The cast membrane was allowed to desolvate for 30 seconds and was then immersed in methanol, the precipitating agent.

The membrane was dried.

The resultant product was an opaque microporous membrane of about 1.3 mils in thickness. On visual inspection it appears that the side away from the glass plate during casting was slightly shinier than the side toward the glass plate.

On subsequent testing for permeating properties the $O_2$ and $N_2$ permeabilities for the dried membrane were, respectively, $$18.5 \times 10^{-9} \text{ and } 4.22 \times 10^{-9} \text{ (cc gas RTP, cm thick)/(sec, sq cm, cm Hg } \Delta P\text{)}.$$

The permeability values for normal non-porous polyxylylene oxide membranes for $O_2$ and $N_2$ are, respectively, $$1.7 \times 10^{-9} \text{ and } 0.35 \times 10^{-9} \text{ (cc gas RTP, cm thick)/(sec, sq cm, cm Hg } \Delta P\text{)}$$

respectively. A comparison of the above permeability values establishes that the effective thickness of the whole asymmetric polyxylylene oxide membrane was about 2.7 microns, which indicates a skin thickness of 2.7 microns or less. The mathematics of this comparison is as follows:

$$\frac{0.35 \times 10^{-9}}{4.22 \times 10^{-9}} \quad 1.3 \text{ mils} \quad 25.4 = 2.7 \text{ microns}.$$

The oxygen-to-nitrogen permeability ratios for both the membrane prepared in Example 1 and normal non-porous polyxylylene oxide membranes is substantially constant thereby verifying the presence of a non-porous skin.

EXAMPLE 2

Polycarbonate resin was dissolved in methylenechloride to form a 20 wt % solution. The solution is then mixed with toluene in a volume ratio of 2 to 1. The methylenechloride is the good, volatile solvent and the toluene is the poor, non-volatile solvent.

A membrane was doctor blade cast in air (ambient conditions) on a glass plate at a liquid thickness of 20 mils and was allowed to desolvate in air for one minute. The glass plate and membrane were then immersed in methanol and the membrane allowed to "gel."

the resultant product was a white, opaque membrane 4 mils thick with a nitrogen permeability of $0.62 \times 10^{-9}$ (cc gas RTP, cm thick)/(sec, sq cm, cm Hg $\Delta P$) and $Pr_{O_2}/Pr_{N_2} = 4.5$. The accepted "dense membrane" values for polycarbonate are $Pr_{N_2} = 0.037 \times 10^{-9}$ and $Pr_{O_2}/Pr_{N_2} = 4.6$.

Thus the effective thickness of the 4-mil asymmetric film is calculated to be 0.24 mil. As is indicated in Example 1, this is an indication of the skin thickness. The balance of the membrane was made up of microporous (graded porosity) crystalline structure.

EXAMPLE 3

The same casting solution as in Example 2 was cast but the desolvation time was reduced to 30 seconds. The resultant white, opaque, 4-mil film had a nitrogen permeability of $14.7 \times 10^{-9}$ and $Pr_{O_2}/Pr_{N_2} = 0.92$. The low separation factor indicates an asymmetric microporous structure without a non-porous barrier.

EXAMPLE 4

A polyvinyl butyrate solution of the following is prepared:

7.5 gm polyvinyl butyrate
8 cc glacial acetic acid
34 cc methyl ethyl ketone (MEK)
7 cc formamide Acetic acid and MEK constitute good co-solvents and formamide is the pore-forming poor solvent. It has been found that casting solutions containing formamide are unstable. Unexpectedly, acetic acid (in addition to its solvent action) acts as a stabilizer for the solution.

Membranes were cast in thicknesses of three mils, desolvated, and gelled in water. The results of subjecting these identical films to different desolvation times are shown in the following table.

| Desolvation Time | $Pr_{N_2}$ | $\left(\dfrac{cc}{cm^2 sec}\right)\left(\dfrac{cm\ thick}{cm\ Hg\Delta P}\right)$ | $Pr_{O_2}/Pr_{N_2}$ |
| --- | --- | --- | --- |
| 1 min | | $15.2 \times 10^{-9}$ | 1.3 |
| 2 min | | $5.8 \times 10^{-9}$ | 1.7 |
| 16 min | | $2.58 \times 10^{-9}$ | 2.1 |

It is apparent that as desolvation time increases there is an increased degree of skin formation as seen by changes in $Pr_{O_2}/Pr_{N_2}$. However, the desolvation time was not long enough to develop a non-porous skin on the membrane using this particular solvent system. By way of comparison, a non-porous film of polyvinyl butyrate exhibits values as follows:

$0.077 \times 10^{-9}$ (cc/cm² sec) (cm thick/cm Hg $\Delta P$) for the nitrogen permeability and 2.6 for the $Pr_{O_2}/Pr_{N_2}$.

What I claim as new and desire to secure by Letters Patent of the United States:

1. A method for the preparation of asymmetric polymer membranes comprising the steps of:
   a. dissolving at least about 5 percent by weight of polyarylene oxide in a solvent system, said solvent system consisting of chloroform and dichlorobenzene,
   b. casting a layer of the polyarylene oxide solution so formed on a flat clean surface in a thickness ranging from about 5 to 25 mils, whereby a single major surface is exposed,
   c. permitting desolvation to occur for less than 1 minute,
   d. immersing said layer in methanol,
   e. removing the asymmetric polyarylene oxide membrane so produced having a non-porous skin and
   f. drying said polyarylene oxide membrane.

2. The method recited in claim 1 wherein the polymer material is polyxylylene oxide.

* * * * *